(12) United States Patent
Bondioli

(10) Patent No.: US 6,174,238 B1
(45) Date of Patent: Jan. 16, 2001

(54) TORQUE LIMITING COUPLING WITH SINGLE RE-ENGAGEMENT POSITION

(76) Inventor: Edi Bondioli, Via Gina Bianchi 18-, 43028 Suzzara, Mantova (IT)

( * ) Notice: Under 35 U.S.C. 154(b), the term of this patent shall be extended for 0 days.

(21) Appl. No.: 09/242,382

(22) PCT Filed: Jul. 28, 1997

(86) PCT No.: PCT/IT97/00190

§ 371 Date: Feb. 12, 1999

§ 102(e) Date: Feb. 12, 1999

(87) PCT Pub. No.: WO98/06959

PCT Pub. Date: Feb. 19, 1998

(30) Foreign Application Priority Data

Aug. 14, 1996 (FI) ............................................. FI/96/A/0199

(51) Int. Cl.[7] .................................................. F16D 7/04
(52) U.S. Cl. ............................................... 464/37; 464/30
(58) Field of Search .................................. 464/30, 37, 34, 464/35

(56) References Cited

U.S. PATENT DOCUMENTS

| 4,468,206 | * | 8/1984 | Herchenbach et al. | 464/37 |
| 5,308,281 | * | 5/1994 | Nienhaus | 464/30 |
| 5,706,922 | * | 1/1998 | Bondioli | 464/37 |
| 5,718,634 | * | 2/1998 | Mikeska et al. | 464/37 |

FOREIGN PATENT DOCUMENTS

| 912411 | 4/1954 | (DE) . |
| 2936755A1 | 3/1981 | (DE) . |
| 3205513C1 | 3/1983 | (DE) . |
| 96830108 | 3/1996 | (EP) . |
| 2570425 A1 | 3/1986 | (FR) . |
| 2615256 A1 | 11/1988 | (FR) . |

OTHER PUBLICATIONS

PCT Search Report Nov. 20, 1997.

* cited by examiner

Primary Examiner—Lynne H. Browne
Assistant Examiner—Aaron Dunwoody
(74) Attorney, Agent, or Firm—McGlew and Tuttle, P.C.

(57) ABSTRACT

A torque limiting coupling has recesses (5) parallel to the axis of rotation on the inner surface (1C) of an outer member (1), and an equal number of keys (20) slidable radially in seats (18) in an inner member (3) and elastically biased towards recesses (5). In order to ensure engagement of the keys (20) in the recesses (5) in a single relative angular position of the inner and outer members (1, 3), each recess contains at least one peg (41) flush with the inner surface (1C) of the outer member (1), and each key (20) contains a through notch (43), the axial position of each peg (41) and notch (43) of the corresponding recess (5) and key (20) are unique.

5 Claims, 7 Drawing Sheets

TORQUE LIMITING COUPLING WITH SINGLE RE-ENGAGEMENT POSITION

FIELD OF THE INVENTION

The invention relates to a transmission coupling, especially of the torque limiting type which disengages the driven member from the drive member when the transmitted torque exceeds a maximum value and which enables re-engagement when the relative velocity drops, the members consisting of an outer member and an inner member.

BACKGROUND OF THE INVENTION

A torque limiting coupling of this type is described in Italian patent application No. FI/95/A/56 filed Mar. 23, 1995 by the same applicant, and in the corresponding European Patent Application n. 96830108.5, U.S. Pat. application Ser. No. 08/620,006 and Canadian Pat. Appl. N. 2,172,120.

These transmission couplings generally have two or more possible angular positions in which coupling can occur, a corresponding number of components for effecting the coupling being arranged in an angular distribution. This sometimes raises a problem for these transmission couplings, for which it would be desirable for coupling to occur in a unique angular position.

The abovementioned intellectual property document discloses in particular a transmission coupling that comprises: on the internal surface of the outer member, recesses with lead-in surfaces running parallel to the axis of rotation; inside the inner member, essentially radial seats allowing movement and defined by two planar walls parallel to the axis of rotation of the coupling, said essentially radial seats for allowing movement being equal in number to said recesses with lead-in surfaces; in each of said essentially radial seats for allowing movement, a sliding key resembling a tablet in shape and able to move radially under the action of elastic means in a centrifugal direction, and with a shaped outer profile able to enter one or other of said recesses with lead-in surfaces of the outer member, in order to transmit torque between said two members and generate centripetal radial forces on the sliding key.

SUMMARY AND OBJECTS OF THE INVENTION

In order to engage the coupling only in one specific angular position of the two members with respect to each other, according to the invention, in each of said recesses with lead-in surfaces there is at least one peg flush with the internal surface of said outer member, and also in each of said tablet-like sliding keys at least one transverse through notch is formed, each of said notches being designed so as to accommodate one of said pegs: the arrangement of the peg or pegs in each of the various recesses is different from that in the other recesses and corresponds to the arrangement of the notch or notches of one sliding key only; each sliding key can therefore only enter the corresponding recess, whereas it continues past the other recesses, sliding over their pegs. Engagement thus occurs only in one unique angular position of the two members of the coupling with respect to each other and simultaneously with all the sliding keys in their corresponding recesses.

In practice each recess may contain at least two pegs and each sliding key at least two notches, preferably set apart from each other, so as to have balanced pressure on the sliding keys as they pass over the pegs of a recess that is not their own. The pegs may be made in the form of screws and may engage in tapped holes in the outer member.

The description and accompanying drawing will enable the invention to be understood more fully: the drawing shows a practical, non-limiting illustrative embodiment of the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
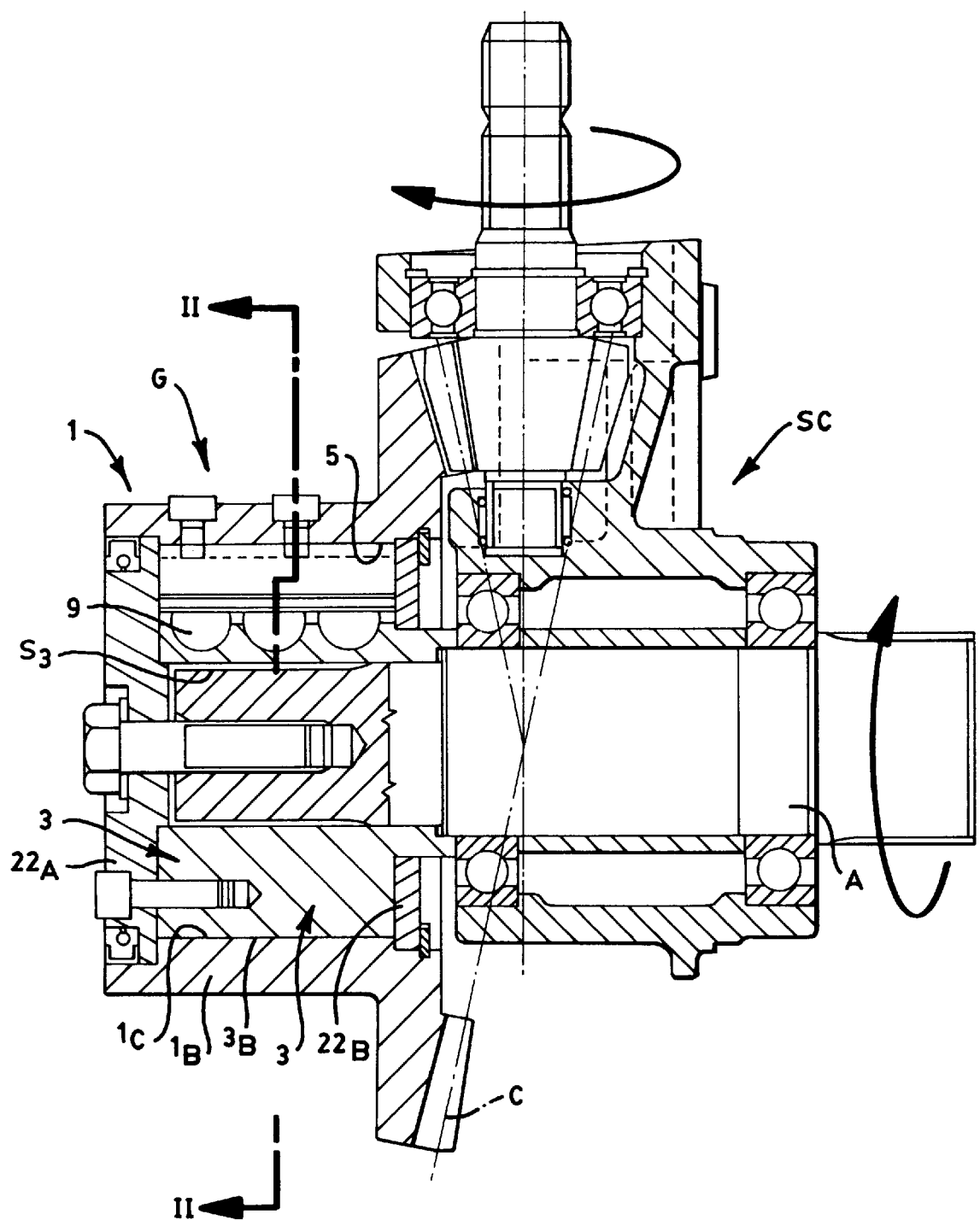
FIG. 1 shows a section through a torque limiter according to the invention, applied to a gearbox.
Figure 2:
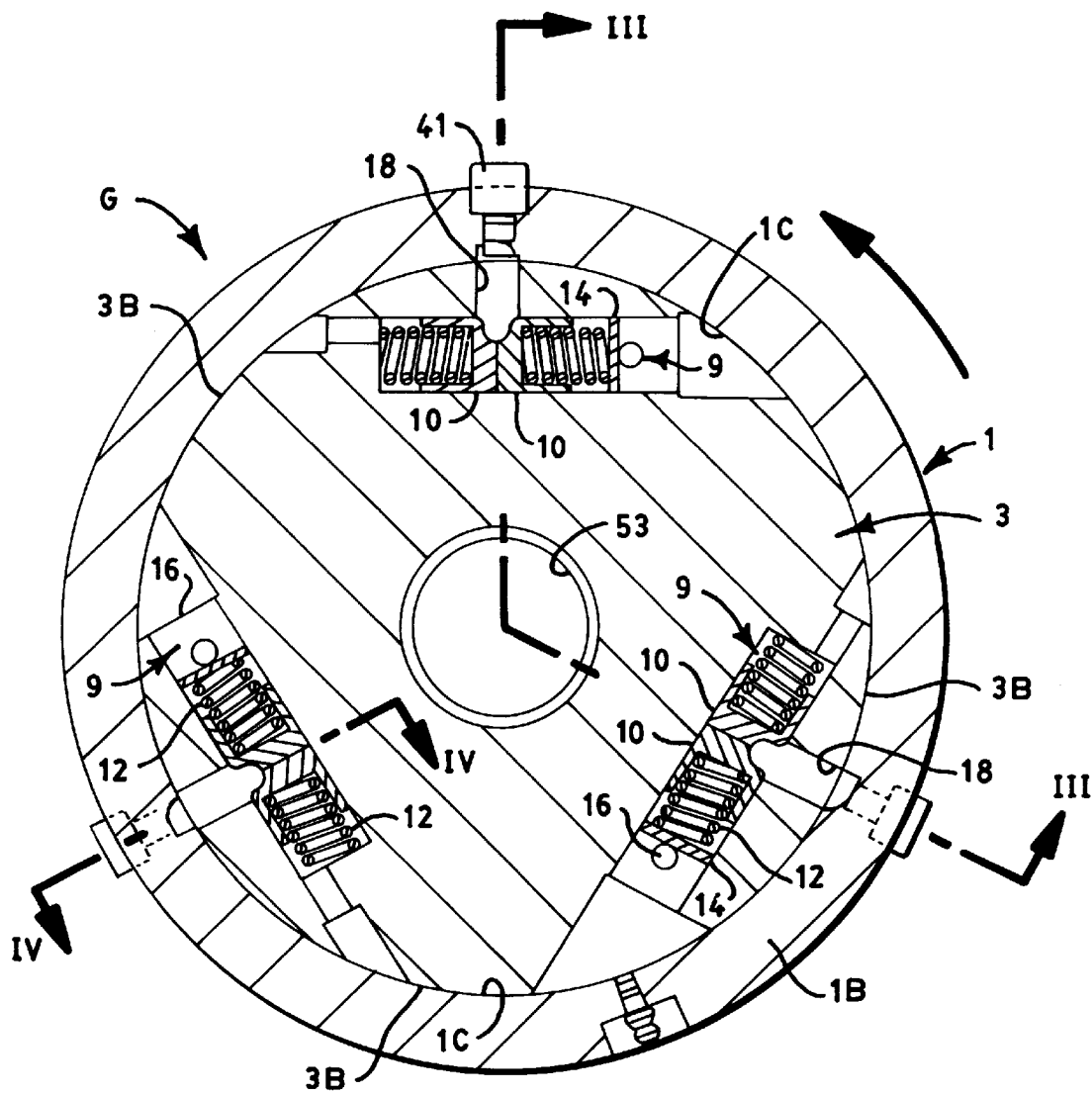
FIG. 2 is a section on II—II as marked in FIG. 1, with the drive member and driven member in engagement.
Figure 3:
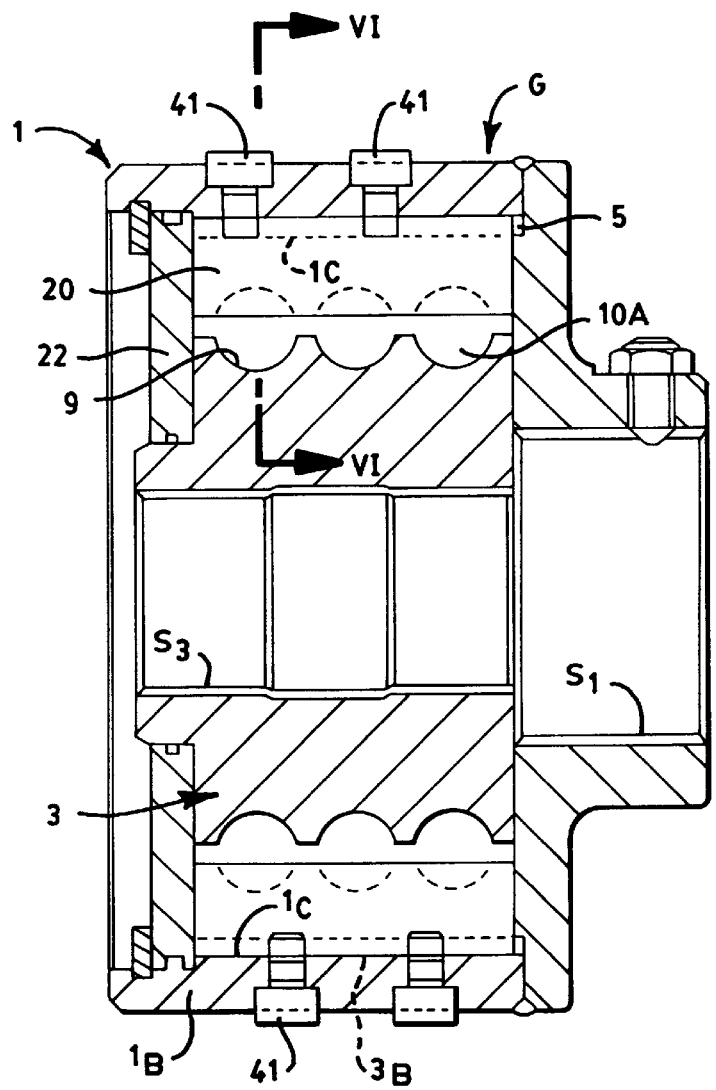
FIGS. 3 and 4 show sections on III—III and IV—IV as marked in FIG. 2, but relating to a version with coaxial drive and driven shafts.

In the drawing, 1 and 3 are general references for an outer member and an inner member of a torque-limiting coupling or clutch G, one of the two members being the drive member and the other driven. In FIG. 1 the clutch G forms part of a gearbox SC with bevel gears, in which the ring gear C is formed by the outer member 1 while the inner member 3 forms the seat S3 for a shaft A. In FIGS. 2 and 3 the clutch G is combined with two shafts, whose splined seats Si and S3 are coaxial and are part of member 1 and member 3, respectively.

Figure 8:
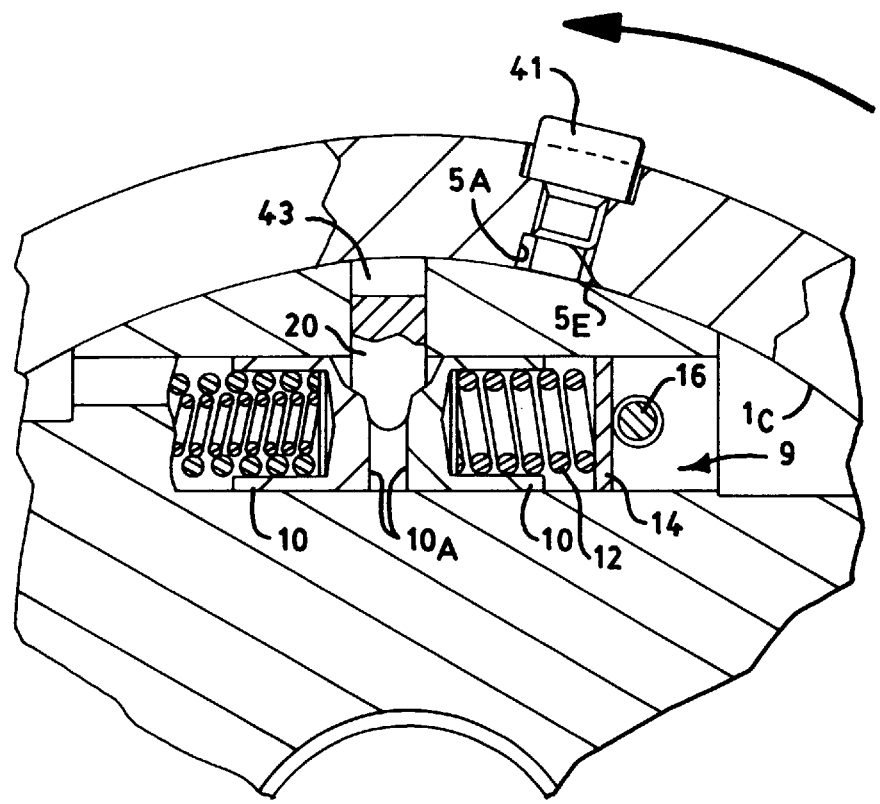
FIGS. 8 to 10 show greatly enlarged details of sections similar to those of FIGS. 2 to 6.
Figure 9:
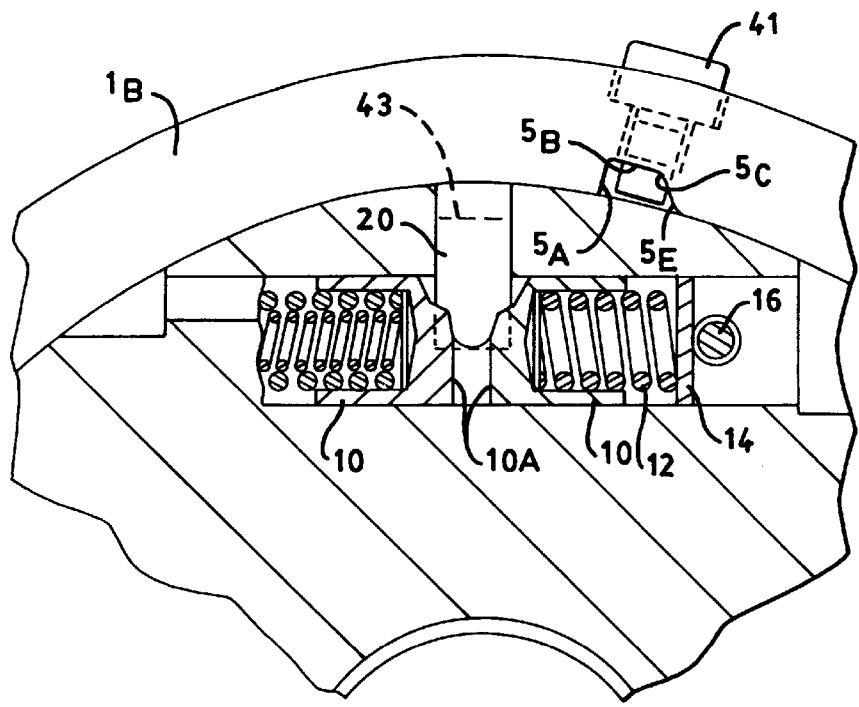
Figure 10:
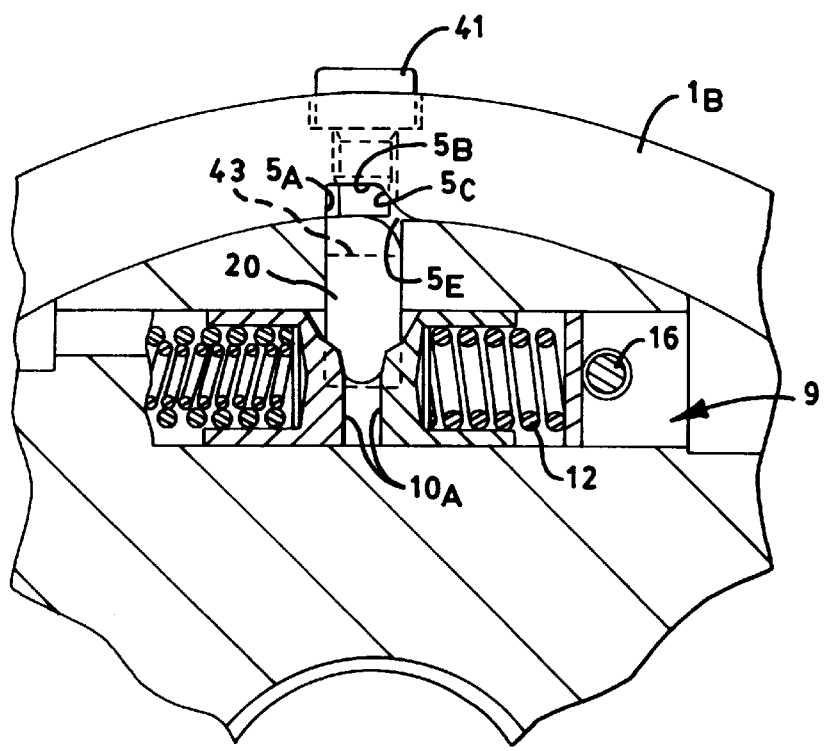

The outer member 1 comprises a skirt 1B that surrounds the inner member 3; this skirt 1B has in particular an internal surface 1C which is a circular cylinder. From said internal surface 1C of the skirt 1B of the outer member 1 there extend two or more recesses 5 (three recesses according to the drawing), each of which possesses (see FIGS. 8 to 10) a first, generally radially lateral wall 5A, an end wall 5B generally corresponding in shape to the shape of the internal surface 1C of the skirt 1B, a second lateral wall 5C forming an angle with a radial direction, and a joining all 5E between the second lateral wall 5C and said internal surface 1C of the skirt 1B of the outer member 1.

The inner member 3 contains an axial hole forming the seat S3 (a through hole in the drawing) and bounded by portions of a cylindrical surface 3B that generally corresponds to the internal surface 1C of the skirt 1B forming part of the outer member 1.

Figure 11:
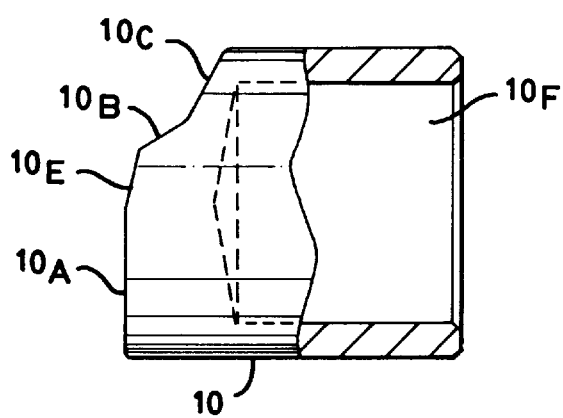
FIGS. 11 and 12 show two views—one of which is partially sectioned—of one of the buffers contained in the member fitted with the radially sliding keys.
Figure 12:
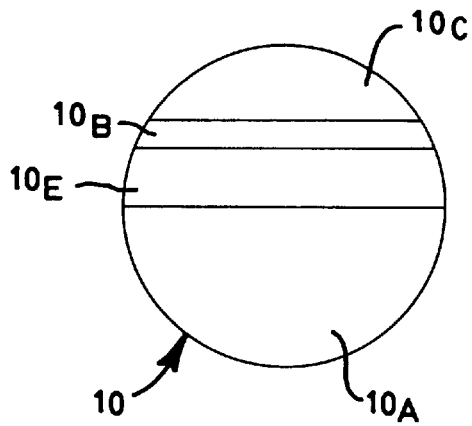
Figure 13:
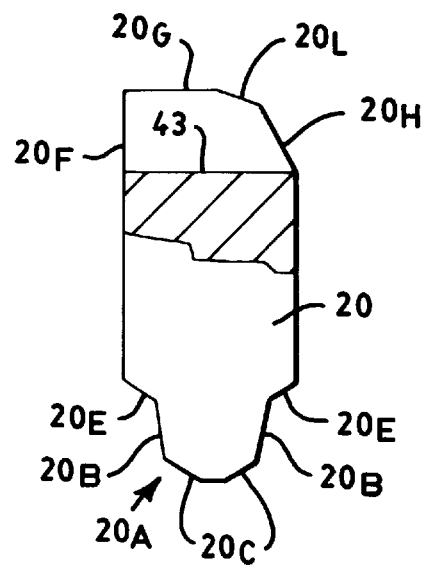
FIG. 13 shows a highly enlarged section on XIII—XIII as marked in FIG. 7, of a sliding key.

In accordance with the drawing, three groups of tangential seats 9 are formed inside the member 3, each group consisting—in the drawing—of three seats 9 located side by side. Said seats 9 in practice are cylindrical seats whose axes lie in a plane perpendicular to the axis X—X of rotation of the coupling G formed by the two members 1 and 3. Each seat 9 is a blind hole and is largely circular sectioned. Each seat 9 contains two sliding buffers 10 which oppose each other on a plane parallel to a radial plane passing through the axis X—X. The opposing faces 10A of two buffers 10 housed in a common seat 9 include (see FIGS. 11 and 12) lead-in surfaces made up of opposing intermediate areas 10B defining portions of a dihedral with a wide aperture and followed—on opposite sides of the intermediate areas 10B—by outward areas 10C and inward areas 10E defining, with the corresponding areas of the opposing buffer, two dihedrals the aperture of which is narrower than the aperture of the dihedral formed by the intermediate areas 10B of the two opposing buffers 10. On the opposite side of each buffer 10 from the shaped side 10A is a large axial housing 10F for housing springs 12, which may be replaceable and/or multiple in order to exert a spring force on their respective buffers 10 towards the opposite buffer, i.e. a force that tends to push the two shaped surfaces 10A, 10B, 10C, 10E of the two opposing buffers 10 together. The springs 12 of one buffer react on the closed end (though this closed end may optionally include a vent hole) of the seat 9 and the springs 12 of the other of the buffers 10 react on bearing surface 14 inserted in the seat 10 and held here by a pin means 16 or equivalent to enable the fitting of the components housed in each of the seats 9. Over each group of seats 9 the inner member 3 has a seat 18 allowing radial movement (FIGS: 8 to 10), this seat being defined by two planar walls lying in geometrical planes perpendicular to the axis of the corresponding seats 9, and said radial-movement seat 18 interferes with the corresponding seat or seats 9. In each radial-movement seat 18 is a sliding key 20 that can move in a radial direction: It resembles a tablet in shape with an inward profile 20A shaped to mate with the surfaces 10B, 10C, 10E of the opposing buffers 10. This inward profile 20A comprises two intermediate surfaces 20B on opposite sides forming a dihedral of narrow aperture, two terminal surfaces 20C on opposite sides forming a dihedral of wider aperture and defining the edge of the wedge, and two other surfaces 20E on opposite sides forming a dihedral of the same wider aperture (like the surfaces of the dihedral of surfaces 20C); the angles of the dihedral surfaces 20B correspond approximately to those of surfaces 10E and the angles of dihedral surfaces 20C and 20E correspond preferably roughly to those of surfaces 10B of the buffers. Each sliding key 20 also includes an outward profile shaped to correspond to the recesses 5; in particular, the outward shaping comprises a first, approximately radial lateral wall 20F which corresponds to the first lateral wall 5A of the recess 5, a terminal surface 20G that extends so as approximately to correspond to the shape of the end wall 5B and of the surface 1C, a second lateral wall 20H at approximately the same angle as the second lateral wall 5C of the recess 5, and a joining wall 20L that extends between said terminal surface 20G and said second lateral wall 20H and that is of approximately the same orientation as said joining wall 5E of the recesses 5.

The inner member 3 is held in place by a cover disc 22 (FIGS. 3 to 5) or by two cover discs 22A, 22B (FIG. 1) mounted at the end of the cavity defined by the skirt 1B. Suitable seals ensure that there is lubrication inside the cavity defined by the skirt 1B so as to maintain the efficiency of the components of the coupling as described above, the manner of operation of which is reviewed below, although it is exhaustively explained in prior Italian patent application FI/95/A/56 with priority of Mar. 23, 1995 or the counterparts thereof.

The present invention differs from the prior invention because it allows the two members 1 and 3 to engage only in a unique relative angular position, whereas in the prior version—which corresponds to the description in Italian Patent Application FI/95/A/56—engagement can occur in any of n angular positions, equal to the number n of recesses 5.

Figure 4:
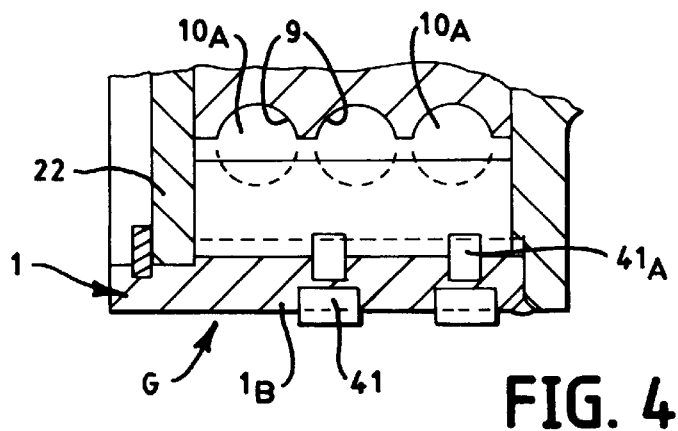
Figure 5:
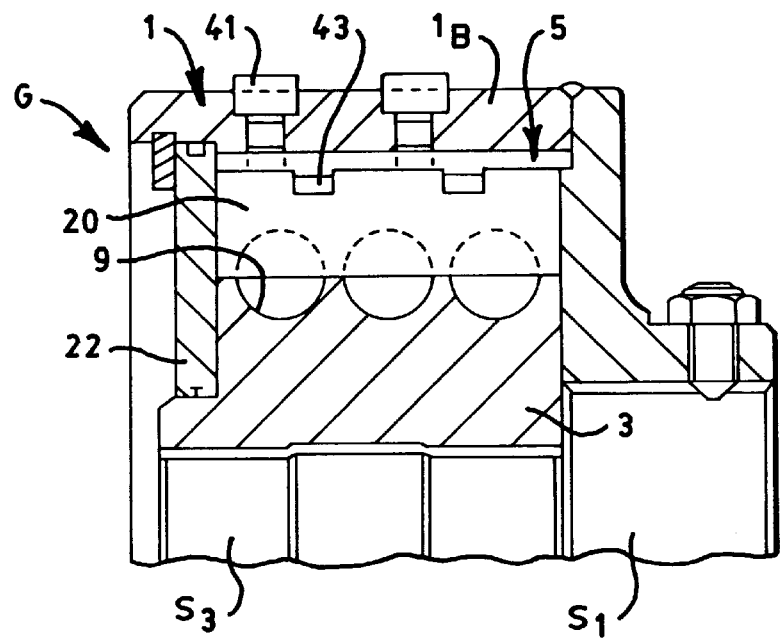
FIG. 5 is similar to the upper part of FIG. 3, but shows the drive member and driven member in disengagement.
Figure 6:
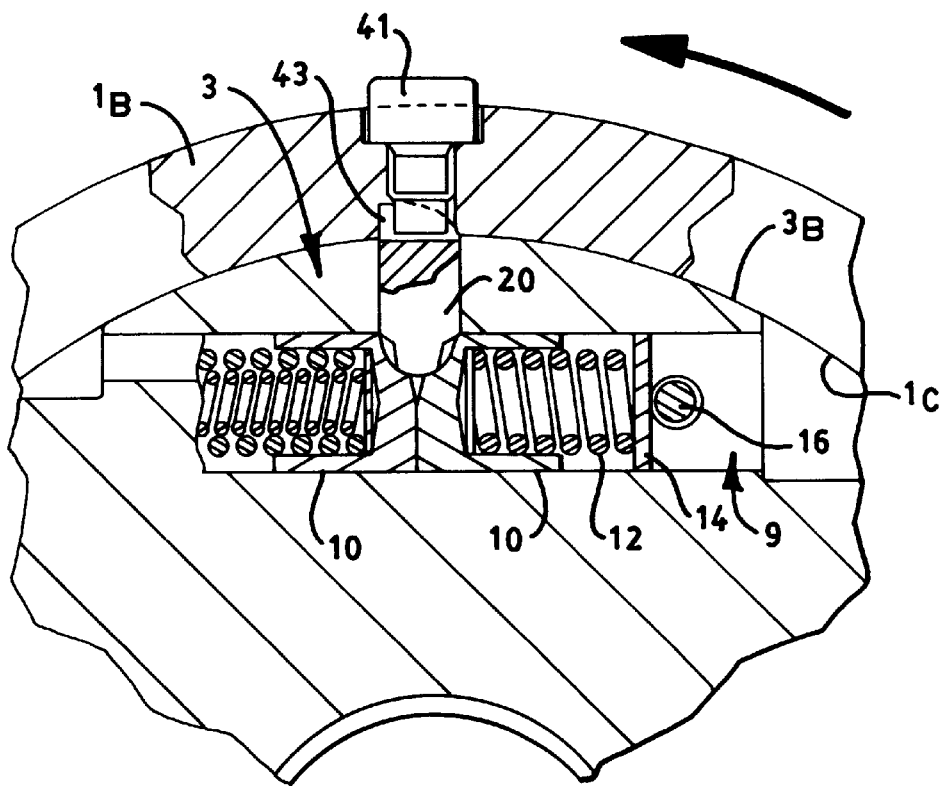
FIG. 6 is a local section on VI—VI as marked in FIG. 3.
Figure 7:
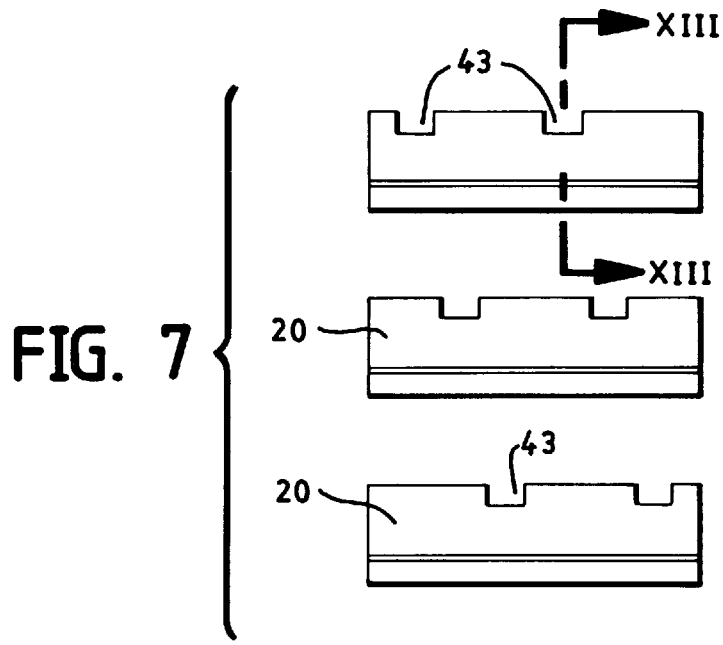
FIG. 7 shows the three different sliding keys in a front view.

In the operation of the clutch according to the prior version, the position of torque transmission is illustrated in FIGS. 2, 3 and 4. The two buffers 10 of each pair of opposing buffers are near together with their surfaces 10A in contact or almost in contact with each other, under the action of the elastic forces of the springs 12. The sliding keys 20 are displaced centrifugally and their outward edges fit into a corresponding recess 5. Consequently the lateral walls 20F and 20H are generally in contact with the lateral walls 5A and 5C, the terminal surface 20G is opposite the end wall 5B, and the wedge surfaces 20C correspond to the opposing intermediate surfaces 10B of the adjacent buffers 10. Transmission occurs via the force acting between the lateral walls 5C and 20H, from the drive member to the driven member, it being immaterial whether the latter is the inner member or the outer. When the resisting torque, which is overcome by the torque transmitted as stated above, exceeds a certain value, a force develops between the inclined surfaces 20H and 5C such that a centripetal force is exerted on the sliding keys 20 and the wedge formed by the surfaces 20C of the inward edge 20A of each sliding key 20 tends to push the two opposing buffers 10 apart, against the action of their respective opposing springs 12. When the resisting torque reaches a predetermined limit, i.e. when the drive torque exceeds a certain limit, the centripetal force on the sliding keys 20 is such as to overcome the elastic reaction of the springs 12 and drive the buffers 10 apart so that instead of being in the position shown in FIGS. 1, 2 and 3, 4 and 6, each unit moves into the position shown in FIGS. 5 and 8 to 10, in which each sliding key 20 has moved inwards centripetally pushing the buffers 10 apart until its wedge surfaces 20E are bearing on the wedge surfaces 10B; in this situation the terminal surfaces 20G of the sliding keys 20 are in line with the internal surface 1C of the skirt 1B of the outer member 1, and the angular engagement of the two members 1 and 3 ceases, allowing relative angular movement between the two members, as shown by the misalignment of the sliding key 20 with the recess 5 as illustrated in FIGS. 5 and 8 to 10. The two members of the coupling or clutch are thereby disconnected and there is relative rotation, which can be quite fast, so that the sliding keys 20 do not tend to re-enter recesses 5 as they pass opposite said keys; this condition continues until this relative angular displacement reduces in speed. The tendency of the keys 20 to enter the recesses 5 is determined by the centrifugal components of the forces applied by the buffers 10 to the keys 20 under the elastic forces of the springs 12, via the contacting surfaces 10E and 20B which define dihedrals of relatively narrow aperture. With a high relative velocity between the two members 1 and 3, the passage of a sliding key 20 over a recess 5 creates at the most a slight impact between the surface of the joining wall 20L and the surface of the joining wall 5E, and the sliding key does not therefore have time to enter the recess 5 and instead continues past the recess 5; this happens until the relative tangential velocity between the two members 1 and 3 reduces to a point at which the centrifugal force on the keys 20 is great enough to cause the keys 20 to enter the recesses 5 once again, and so revert from the position of FIGS. 5 and 8 to 10 to that of FIGS. 1 to 4 and 6; this reduction in relative velocity may also be such as to reach the condition of rest or at any rate of virtually equal velocities between the two members.

In the provisions of Italian patent application FI95A56 or in the corresponding applications claiming the priority thereof, each sliding key 20 can enter any recess 5, which means that the two members 1 and 3 can engage—in accordance with the illustrated example—in any of three angular positions.

By contrast, according to the invention and in accordance with the example illustrated, engagement occurs only in a single angular position of the two members 1 and 3 with respect to each other. This is advantageous or even actually necessary in many applications, for example when the two members must be operated in phase.

As illustrated in the drawing, tapped seats are formed over each of the recesses 5 for the application of two pegs 41 a short distance apart from each other; the position of the two pegs 41 along the longitudinal line of one of the recesses 5 is different from the position of the pegs 41 in each of the other recesses 5. The lower end surfaces 41A of the pegs 41 are level with the internal surface 1C of the outer skirt 1B of the outer member 1, that is to say the end surfaces 41A of the pegs 41 are flush with the surface 1C in the recess 5.

Corresponding to the arrangement of the pegs 41, each sliding key 20 includes two transverse notches 43 passing all the way through from one to the other of the two plane parallel surfaces of the sliding keys 20 that slide against the surfaces 18 of the radial housings formed from the sliding keys in the inner member 3. The through notches 43 are capable of accommodating the inward ends of the pegs 41 which project into the recesses 5. The two notches 43 of any one sliding key 20 correspond to the position of the two pegs 41 positioned in one recess 5; thus, the sliding key 20 can enter said recess when it reaches it because the notches 43 correspond to the pegs 41. Each of the other sliding keys has notches 43 in different positions to those of the pegs 41 of the above sliding key, so that these sliding keys will slide over the surface 1C and over the surfaces 41A of the pegs 41 of the above recess 5, without entering that particular recess. Each of the other two sliding keys 20 can only enter that recess 5 whose pegs 41 correspond in position to the position of the notches 43 of that particular sliding key 20.

In conclusion, therefore, each sliding key can enter only one of the recesses and when one of the sliding keys enters its corresponding recess, the other sliding keys are exactly aligned with their respective recesses and enter them also; in this way the members 1 and 3 engage in a single unique angular position of the two members with respect to each other, and engagement occurs simultaneously with all three sliding keys 20 entering their respective recesses.

The design of the recesses 5 in the direction of rotation and the shape of the joining walls 5E of the various recesses will be such as to ensure continuity of bearing surface for the keys as they slide around the surface 1C and the surfaces of the pegs 41A positioned in the recesses and not belonging to said sliding key, until the moment at which the sliding keys reach their respective recesses.

It will be understood that the drawing, shows only an illustrative embodiment purely as a practical demonstration of the invention, which latter may be varied in its shapes and arrangements without thereby departing from the scope of the concept underlying said invention. The presence of any reference numerals in the accompanying claims is for the purpose of facilitating the reading of the claims with reference to the description and to the drawing, and does not limit the scope of protection represented by the claims.

What is claimed is:

1. Torque transmitting and limiting coupling which disengages a driven member from the drive member when transmitted torque exceeds a maximum value and which enables reengagement when relative velocity drops, the members including an outer member and an inner member, said coupling comprising: on an internal surface of said outer member, recesses with lead-in surfaces running parallel to the axis of rotation; inside the inner member, essentially radial seats allowing movement and defined by two planar walls parallel to the axis of rotation of the coupling, said essentially radial seats for allowing movement being equal in number to said recesses with lead-in surfaces; in each of said essentially radial seats for allowing movement, a sliding key resembling a tablet in shape and able to move radially under the action of elastic means in a centrifugal direction, and with a shaped outer profile able to enter one or other of said recesses with lead-in surfaces the outer member, in order to transmit torque between said inner and outer members and generate centripetal radial forces on the sliding key; each of said recesses with lead-in surfaces having at least one peg flush with the internal surface of said outer member; and in that in each of said tablet-like sliding keys at least one transverse through notch is formed, each notch being designed so as to accommodate one said peg; the arrangement of the peg in each of the various recesses being different from that in the other recesses and corresponding to the arrangement of the notch of one sliding key only, so that each sliding key can only enter the corresponding recess and continues past the other recesses, sliding over their peg, and engagement occurs only in one unique angular position of the two members of the coupling with respect to each other and simultaneously with all the sliding keys in their corresponding recesses.

2. Torque transmitting and limiting coupling according to claim 1, wherein each recess includes at least two pegs and each sliding key contains at least two notches, preferably set apart from each other.

3. Torque transmitting and limiting coupling according to claim 1, wherein the pegs are made in the form of screws and engage in tapped holes in the outer member.

4. A torque limiting coupling comprising:
   an inner member defining a plurality of seats opening radially outward;
   an outer member surrounding said inner member, said inner and outer members being rotatable with respect to each other, said outer member having an inner surface defining a plurality of recesses;
   a plurality of keys, each of said keys being arranged radially movable in one of said seats of said inner member and being insertable into one of said recesses of said outer member;
   a plurality of biasing devices for biasing each of said keys radially outward;
   each of said keys and each of said recess having a shape cooperating with said biasing devices to rotationally lock said inner and outer member together below a predetermined torque, and to rotationally slip said inner and outer members past each other above said predetermined torque, at least one of said keys having at least one uniquely arranged notch structure;
   at least one peg structure uniquely positioned in one of said recess and having an end arranged flush with an inner surface of said outer member, said peg structure corresponding with said notch structure to allow entry of said one key into said one of said recesses and to block remaining said keys from entry into said one recess.

5. The torque limiting coupling in accordance with claim 4, wherein:
   said peg structure includes a plurality of pegs uniquely arranged in a plurality of said recesses;
   said notch structure includes a plurality of notches uniquely arranged in a plurality of said keys.

* * * * *